(12) United States Patent
Boneberg et al.

(10) Patent No.: US 7,214,437 B2
(45) Date of Patent: May 8, 2007

(54) METHOD FOR ELECTRICALLY STARTING UP A FUEL CELL

(75) Inventors: Stefan Boneberg, Beuren (DE); Manfred Strohmaier, Ohmden (DE); Erik Theis, Kirchheim/Teck-Nabern (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 568 days.

(21) Appl. No.: 09/985,643

(22) Filed: Nov. 5, 2001

(65) Prior Publication Data

US 2002/0058166 A1    May 16, 2002

(30) Foreign Application Priority Data

Nov. 4, 2000    (DE) .................................. 100 54 842

(51) Int. Cl.
*H01M 8/04* (2006.01)
*H01M 8/00* (2006.01)

(52) U.S. Cl. ................................ 429/17; 429/13
(58) Field of Classification Search .............. 429/192, 429/203, 19, 13, 17, 652, 22, 24, 26, 25, 429/16, 20; 95/96; 423/652, 651; 48/197 FM, 48/127.9, 197 R; 422/198; 180/65.2
See application file for complete search history.

(56) References Cited

U.S. PATENT DOCUMENTS

| | | | | |
|---|---|---|---|---|
| 4,041,210 A * | 8/1977 | Van Dine | ...................... | 429/16 |
| 4,464,444 A * | 8/1984 | Mikawa | ....................... | 429/13 |
| 4,680,240 A * | 7/1987 | Furukawa et al. | ............. | 429/13 |
| 4,820,594 A * | 4/1989 | Sugita et al. | .................. | 429/17 |
| 6,063,515 A * | 5/2000 | Epp et al. | ...................... | 429/17 |
| 6,472,092 B1 * | 10/2002 | Matsuda et al. | ............... | 429/17 |
| 6,764,780 B2 * | 7/2004 | Roberts et al. | ................ | 429/13 |

FOREIGN PATENT DOCUMENTS

DE    19715409 A1 *    10/1997

* cited by examiner

*Primary Examiner*—Susy Tsang-Foster
*Assistant Examiner*—Robert Hodge
(74) *Attorney, Agent, or Firm*—Crowell & Moring LLP

(57) ABSTRACT

A method is used to start up a fuel cell electrically in a fuel cell installation, especially a fuel cell for use in a motor vehicle, with a gas-generating system producing a hydrogen-containing gas flow. The gas flow from the gas-generating system and an oxygen-containing gas flow are brought together and combusted after the fuel cell. The fuel cell is started up electrically as a function of a temperature course existing in the region of combustion of the gas flows.

11 Claims, 1 Drawing Sheet

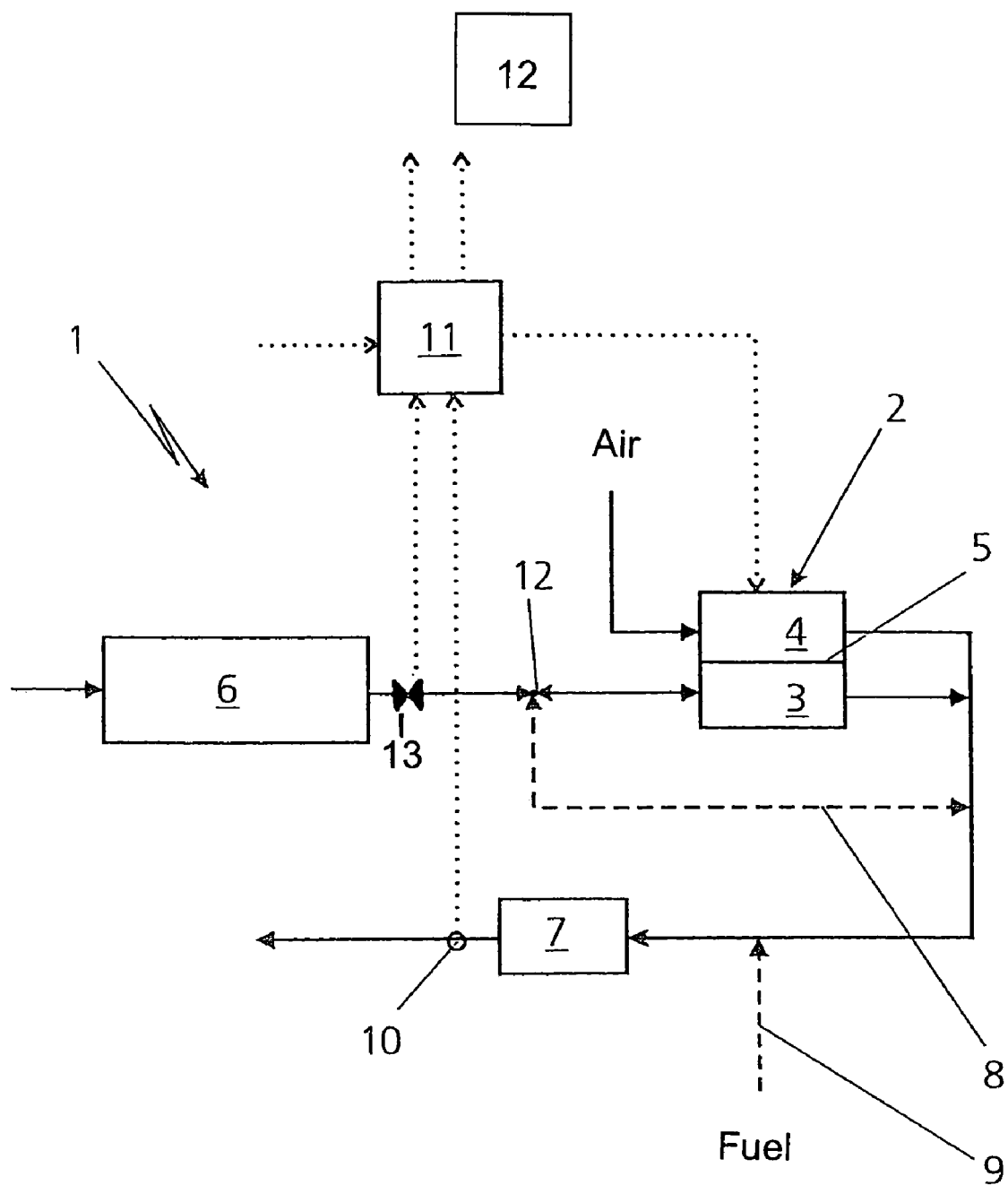

METHOD FOR ELECTRICALLY STARTING UP A FUEL CELL

BACKGROUND AND SUMMARY OF INVENTION

This application claims the priority of German patent document 100 54 842.3, filed Nov. 4, 2000, the disclosure of which is expressly incorporated by reference herein.

The invention relates to a method for electrically starting up a fuel cell in a fuel cell installation.

It is generally known from the state of the art that starting up a fuel cell in a fuel cell installation electrically may take place (in order to avoid damaging the fuel cell, especially the membranes of a PEM fuel cell) only when there is a sufficiently large flow of the hydrogen-containing gas originating from a gas-generating system and with a sufficiently high concentration of hydrogen in the fuel cell.

Therefore, in a very simple solution of this problem, a certain period of time is allowed to elapse after the start of the gas-generating system, before the fuel cell started up electrically. In this case, empirical values are used, which imply that after the elapsed time, it is a very likely that a flow of gas of adequate quality and amount is present in the region of the anode space of the fuel cell.

In order to optimize the starting-up process of such a fuel cell installation and to determine the presence of an adequate amount and an adequate quality of hydrogen-containing gas, Japanese publication JP 630 45 766 A1 discloses a temperature detector that is disposed in the region of a reformer of the gas-generating system. Once the reformer of the gas-generating system has reached a specified temperature, it is assumed that the reformer is operating correctly and that the appropriate amount of hydrogen-containing gas can be made available in the gas-generating system. A similar procedure is also disclosed in Japanese publication JP 021 58 061 A1.

It is a common feature of the two Japanese publications that the fuel cell or the anode space of the fuel cell has a bypass line, so that the gas originating from the gas-generating system is passed through the fuel cell only where the electrical switching-on of the fuel cell is imminent.

The two Japanese publications have the serious disadvantage that the condition of the gas-generating system can be determined only from the temperature in the region of the gas-generating system, from which corresponding conclusions concerning the correct working capability of the gas-generating system are then drawn. However, it is particularly disadvantageous that the quality and the amount of the hydrogen in the reformate itself cannot be determined.

It is therefore an object of the present invention to provide a method for the electrical starting up of a fuel cell in a fuel cell installation with a gas-generating system, which ensures that when the fuel cell is started up, a sufficient amount of hydrogen-containing gas with a sufficient concentration of hydrogen is available to operate the fuel cell.

Pursuant to the present invention, preferred embodiments of the present invention include combining a hydrogen-containing gas flow from a gas-generating system and an oxygen-containing gas flow downstream of a fuel cell; combusting the combined gas flows; and starting up the fuel cell electrically as a function of a temperature existing in a region of the combined gas flows.

The special advantage lies in the comparatively simple construction, which requires that a temperature sensor be present in the region of combustion of the two gas flows downstream from the fuel cell.

A further decisive advantage is that the combustion takes place only downstream from the fuel cell, so that it can be ensured, by the course of the temperature, that the appropriate amount and quality of hydrogen-containing gas is supplied to the fuel cell. It is not assumed, as it is in the state of the art, that such a gas would, in all probability, have to be produced in the gas-generating system.

The space-saving method, using simple and robust components, has the advantage of a very high operational reliability and ensures a correspondingly long service life, without requiring a complex system of surfaces sensors.

Other objects, advantages and novel features of the present invention will become apparent from the following detailed description of the present invention when considered in conjunction with the accompanying drawings.

BRIEF DESCRIPTION OF THE DRAWING

The sole FIGURE shows a diagram of a fuel cell installation with a gas-generating system according to the present invention.

DETAILED DESCRIPTION OF THE DRAWING

The core of a fuel cell installation 1 is formed by a fuel cell 2 with an anode space 3, a cathode space 4 and a membrane 5, which separates the anode space 3 from the cathode space 4.

A stream of hydrogen-containing gas, the so-called reformate flow, is supplied by a known gas-generating system 6, in which the reformate is produced, for example, from liquid hydrocarbons to the fuel cell 2. This stream of reformate then flows through the anode space 3 of the fuel cell 2 and, after the fuel cell (in the direction of flow), reaches a catalytic burner 7. In addition, air is passed through the cathode space 4 of the fuel cell, the flow of air or of a different oxygen-containing gas being mixed after the fuel cell 2 with the gas flowing through the anode space 3, so that the flows of gas reach the catalytic burner 7 together.

In principal, it is also conceivable that the two flows of gas mix only in the region of the catalytic burner 7.

In addition, the fuel cell installation 1 may have a bypass line 8 for the anode space 3 of the fuel cell 2. The function of the bypass line 8 will be dealt with in greater detail below. The bypass line 8 is shown by broken lines, since its presence is merely an option and it is required only when appropriate boundary conditions exist in the fuel cell installation 1.

Likewise, the fuel cell installation 1 has an optional supply line 9 for an additional fuel, such as methanol or hydrogen, in at least one of the gas flows in the flow direction between the fuel cell 2 and the catalytic burner 7. Additional fuel can be metered into the region of the catalytic burner 7 over the feed line 9, should this be necessary. An appropriate case may occur, for example, during the starting up of the gas-generating system 6, which could be supplied, in a further option, with thermal energy at least partially by the catalytic burner 7. In that case, it would be advantageous during the start of the gas-generating system 6 to start supplying air through the cathode space 4 of the fuel cell 2. By supplying additional fuel through the feed line 9 to the catalytic burner 7, heat is generated that can be used as the thermal energy required to start the gas-generating system 6.

A temperature sensor 10, which detects the course of the temperature in or in the region of the exhaust gases after the catalytic burner 7, is shown in the fuel cell installation 1. The data, detected by the temperature sensor 10, is supplied to an appropriate control and regulating system 11, which, among other things, controls and regulates the electrical starting up of the fuel cell. The electrical connection of the fuel cell 2 may be in an appropriate electrical circuit with at least one electrical power absorber 12. Likewise, the representation of appropriate electrical connections or the like in the region of the fuel cell 2, which is indicated diagrammatically, is omitted.

In a first and simple embodiment of a method according to the present invention, the catalytic burner 7 is heated by air, which is passed through the cathode space 4 into the fuel cell 2 and heats the additional fuel, which is introduced over the feed line 9, in order to make the necessary thermal energy available when the gas-generating system is started.

The gas-generating system 6 will then supply a corresponding reformate which, at the start, will contain only very little or no hydrogen. The reformate is rich in appropriate additives in this phase, such as nitrogen, carbon dioxide, carbon monoxide, water and residue of liquid hydrocarbons, which are converted in the gas-generating system 6. This flow of reformate, which is not yet suitable for operating the fuel cell 2, is then passed through the anode space 3 of the fuel cell 2. However, if a corresponding chemical reaction between materials in the reformate flow and elements of the fuel cell 2, especially the membrane 5, is feared, the reformate flows through the bypass line 8 past the fuel cell 2 to the catalytic burner 7, where it comes together with air, which flows through the cathode space 4 of the fuel cell 2.

Depending on its composition, the reformate flow affects the combustion in the catalytic burner 7 in this phase only very slightly if at all. If the gas-generating system 6 nevertheless makes available a sufficient amount of reformate with an adequate concentration of hydrogen, this reformate will also reach the catalytic burner 7 along the flow paths described above. The temperature in the region of the catalytic burner 7 and/or immediately after the catalytic burner, which is detected by the temperature sensor 10, will in this case increase correspondingly. If the temperature in the region of the temperature sensor 10 exceeds a previously specified value, which depends on boundary conditions such as a cold start or a hot start of the gas-generating system 6 or the like, then the amount of hydrogen in the reformate flow is sufficient to guarantee a smooth operation of the fuel cell 2, which can then be started up.

If the corresponding variation over the bypass line 8 is selected, it must be made certain, immediately before the fuel cell 2 is started up, that at least a portion of the reformate flow (in the best case, a portion of the reformate flow which increases steadily during the starting up) passes through an appropriate valve 12 and reaches the region of the anode space 3 of the fuel cell 2.

However, if the simple and space saving variation without the bypass line 8 is selected, it is sufficient to connect the fuel cell 2 into an appropriate electrical circuit, that is, to initiate the starting up of the fuel cell electrically, over the control and regulating device 11.

In principle, the above-described method could, of course, also be realized with a flame burner or the like. However, experience in the area of the gas-generating systems 6 has shown that, for such applications, especially also for making thermal energy available to the gas-generating system 6, a catalytic burner 7 is particularly suitable.

Parallel to these very simple methods, which are described above and for which the presence of an adequate amount of hydrogen-containing gas in the reformate flow is ensured by an increase in the temperature of the catalytic burner 7, the fuel cell installation 1 can also be operated in that, in the region of a temperature sensor 10 an at least approximately constant temperature is ensured with a complete reduction of the fuel supplied in the area of the catalytic burner 7.

As soon as a sufficient amount of fuel or hydrogen has reached the catalytic burner 7 by way of the reformate flow, the amount of fuel additionally supplied over feed line 9, would then have to be reduced correspondingly to keep the temperature in the area of the temperature sensor 10 constant. In this case, if the temperature course is constant, the amount of fuel supplied in the area of the feed line 9 could be used to indicate that there is a sufficient amount of hydrogen in the reformate flow. Once again, the electrical starting up of the fuel cell 2 and here also optionally once again the switching off of the bypass line can be brought about by the control and regulating system 11.

It may optionally be advantageous to lower the temperature, after the catalytic burner 7 has been used to heat the gas-generating system 6 in a heating-up phase before an adequate, hydrogen-containing reformate flow is produced, to avoid a further increase in temperature in the catalytic burner 7 and possible damage to the catalytic materials when the hydrogen-containing reformate flow arrives. This lowering of the temperature can be accomplished simply by decreasing the amount of fuel additionally metered in over the feed line 9 or by increasing the amount of air added over the cathode space 4 of the fuel cell 2 to the catalytic burner 7.

As a result, the possibility arises of working with a very large supply of fuel when the heating of the gas-generating system 6 is commenced, so that the gas-generating system can be heated up very rapidly. By subsequently lowering the temperature in the region of the catalytic burner 7, it is achieved that the catalytic burner can experience a further increase in temperature because of the hydrogen present in the reformate flow, without damage to the catalyst or the like.

Special circumstances during the starting up of the fuel cell 2 in the fuel cell system 1 exist when the fuel cell 2 is of a type that cannot be started at ambient pressure and instead requires pressure above ambient for the startup and operation.

The electrical starting up of the fuel cell 2 by the temperature course in the region of the catalytic burner 7 then has to take place in 2 steps. To begin with, there is the above-described temperature increase in the region of the catalytic burner 7. By the control and regulating device 11, this temperature increase would then have to give a signal to the reformate pressure valve 13 and throttles the reformate flow correspondingly to achieve a pressure above ambient in the gas generating system 6. Due to the throttled reformate flow and, with that, also the throttled supply of hydrogen-containing gas into the region of the catalytic burner 7, the temperature at the temperature sensor 10 will fall correspondingly during the buildup of pressure in the gas-generating system 6. When increasing the pressure in the gas-generating system 6 is concluded and the reformate flow once again flows at full volume to the fuel cell 2 and to the catalytic burner 7, there is a second increase in temperature in the region of the temperature sensor 10. This second increase in the course of the temperature then indicates that the whole of the anode space 3 of the fuel cell 2 is filled with a reformate of adequate quality and that the fuel cell 2 may now be started up electrically.

Here also, after the above-mentioned switching-on conditions are fulfilled and depending on the construction of the fuel cell installation 1, the bypass pipeline 8 can be closed and/or, if the reformate has been passed directly through the anode chamber 3, only the connection between the fuel cell 2 and the electrical circuit with the at least one electrical consumer can be opened by the control and regulating device 11.

After the fuel cell 2 is started up successfully electrically, the desired electrical current can be called for in the specified manner.

In order to reduce the time required for starting up the fuel cell installation 1, it is also possible to monitor the temperature in the gas-generating system 6 and, in addition, to increase the amount of fuel supplied to the gas generating system 6, as the temperature in the gas-generating system 6 increases. Since the amount of fuel, which is converted in the gas-generating system 6, depends on the instantaneous temperature, the maximum amount of fuel can be supplied in each case by this procedure and the time that is required to start up the fuel cell 2 can be reduced.

A preferred application for the method according to the present invention is for fuel cell installations in a motor vehicle.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within scope of the present invention.

What is claimed is:

1. A method for providing an electric power absorber with electric power from a fuel cell in a fuel cell installation, comprising:
    combining a hydrogen-containing gas flow from a gas-generating system and an oxygen-containing gas flow downstream of the fuel cell;
    combusting the combined gas flows in a catalytic burner;
    determining a temperature existing in the catalytic burner or in exhaust gases immediately after the catalytic burner; and
    connecting the fuel cell into a circuit having the electric power absorber if the temperature determined exceeds a specified value.

2. A method according to claim 1, wherein the temperature is measured by a temperature sensor.

3. A method according to claim 1, further comprising adding an additional fuel to the combined gas flows.

4. A method according to claim 3, wherein the connecting occurs as soon as an amount of additional fuel reaches a specified value with complete combustion and the temperature is a constant temperature.

5. A method according to claim 1, further comprising passing the oxygen-containing gas flow through a cathode space of the fuel cell, and passing the hydrogen-containing gas flow through an anode space of the fuel cell before combining the hydrogen-containing and oxygen-containing gas flows and prior to connecting the fuel cell into said circuit.

6. A method according to claim 1, further comprising passing the oxygen-containing gas flow through a cathode space of the fuel cell, passing a portion of the hydrogen containing gas flow through an anode space of the fuel cell, and passing a remaining portion of the hydrogen-containing gas flow through a bypass line past the fuel cell before combining the hydrogen-containing and oxygen-containing gas flows and prior to connecting the fuel cell into said circuit.

7. A method according to claim 1, wherein the connecting occurs at ambient pressure.

8. A method according to claim 1, wherein the connecting occurs at a pressure above ambient pressure.

9. A method according to claim 8, further comprising:
    throttling of the gas flow from the gas-generating system, thereby building up an elevated pressure level and causing an initial decline in the temperature; and
    increasing the temperature to the specified value.

10. A method according to claim 1, further comprising:
    monitoring the temperature; and
    increasing the amount of fuel supplied to the gas-generating system with increasing temperature.

11. A method for providing an electric power absorber with electric power from a fuel cell in a motor vehicle fuel cell installation, comprising:
    combining a hydrogen-containing gas flow from a gas-generating system and an oxygen-containing gas flow downstream of the fuel cell;
    combusting the combined gas flows in a catalytic burner;
    determining a temperature existing in the catalytic burner or in exhaust eases immediately after the catalytic burner; and
    connecting the fuel cell into a circuit having the electric power absorber if the temperature determined exceeds a specified value.

* * * * *